United States Patent [19]
Hayashi

[11] Patent Number: 5,657,312
[45] Date of Patent: Aug. 12, 1997

[54] OPTICAL DISC HAVING PITS IN MULTIPLE REGIONS AND SIGNAL PROCESSING CIRCUIT THEREFOR

[75] Inventor: Hideki Hayashi, Tsurugashima, Japan

[73] Assignee: Pioneer Electronic Corporation, Tokyo-to, Japan

[21] Appl. No.: 403,060

[22] Filed: Mar. 13, 1995

[30] Foreign Application Priority Data

Mar. 15, 1994 [JP] Japan ................... 6-044407

[51] Int. Cl.$^6$ ................................................. G11B 7/24
[52] U.S. Cl. ...................... 369/275.3; 369/275.4
[58] Field of Search ................ 369/275.3, 275.4, 369/58, 275.1, 109, 48, 47, 54, 44.37, 44.41, 44.26, 32, 44.34

[56] References Cited

U.S. PATENT DOCUMENTS

| | | | |
|---|---|---|---|
| 5,280,466 | 1/1994 | Tomita | 369/275.3 |
| 5,321,675 | 6/1994 | Ito et al. | 369/275.4 |
| 5,404,345 | 4/1995 | Taki | 369/275.4 |
| 5,416,766 | 5/1995 | Horimai | 369/275.3 |
| 5,495,460 | 2/1996 | Haraguchi et al. | 369/275.3 |
| 5,508,995 | 4/1996 | Moriya et al. | 369/275.4 |
| 5,517,485 | 5/1996 | Nishiuchi et al. | 369/275.3 |

FOREIGN PATENT DOCUMENTS 340225  2/1991  Japan.

*Primary Examiner*—Tan Dinh
*Attorney, Agent, or Firm*—Kane, Dalsimer, Sullivan, Kurucz, Levy, Eisele and Richard, LLP

[57] ABSTRACT

An optical disc includes: reference signal region formed on the optical disc over a plurality of spirally turned recording tracks in radial direction of the optical disc, each of the recording tracks in the reference signal region including: first region on which a plurality of first pit portion having first period are formed; and second region on which at least a second pit portion having second period is formed, each of the second pit portions being positioned out of alignment with the second pit portions on neighboring tracks.

7 Claims, 9 Drawing Sheets

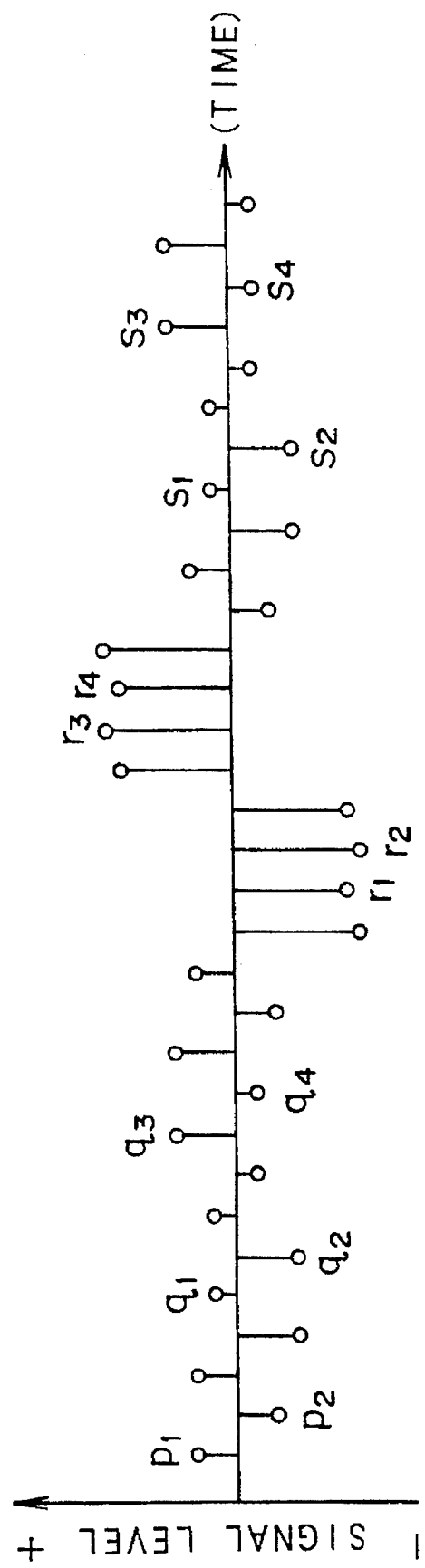

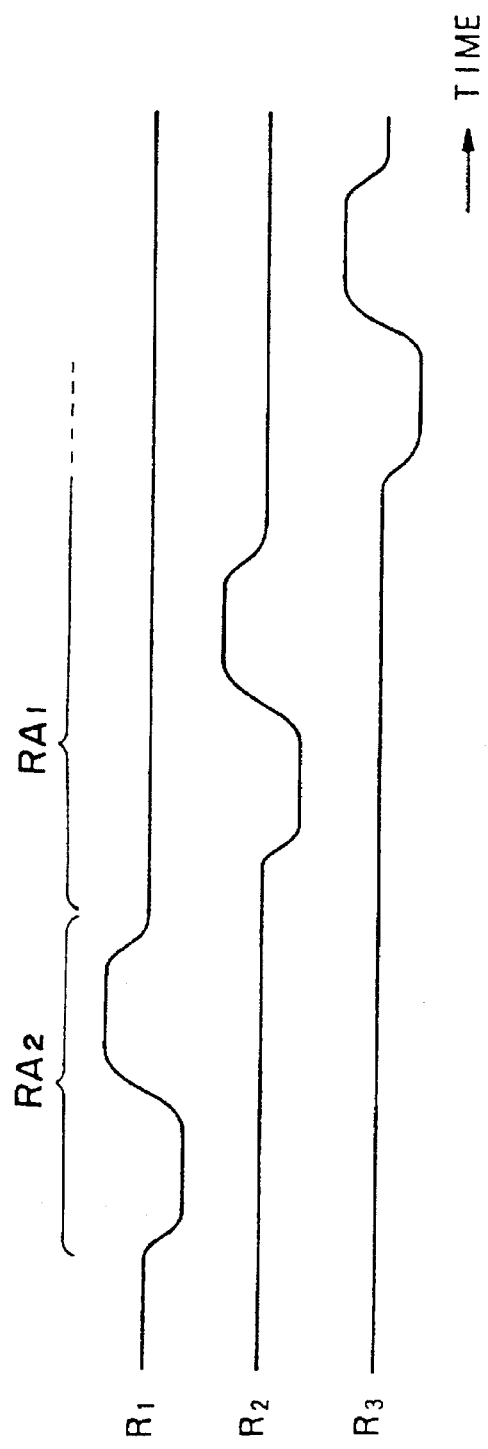

OPTICAL DISC HAVING PITS IN MULTIPLE REGIONS AND SIGNAL PROCESSING CIRCUIT THEREFOR

BACKGROUND OF THE INVENTION

1. Field of the Invention

This invention relates to an optical disc and a signal reproduction apparatus for the same. More particularly, this invention relates to an optical disc with which crosstalk signal can be cancelled, utilizing read out signals of a plurality of tracks, to obtain recorded information of desired track, and a signal processing circuit for processing read-out signals from the optical disc.

2. Description of the Prior Art

There is known an optical disc on which signal is recorded by spirally forming signal pit array serving as recording track on a signal recording surface of the disc from inner circumferential side to outer circumferential side thereof. In order to improve recording density and capacity of such an optical disc, there have been proposed various methods such as increasing recording density in recording track direction, reducing a diameter of read-out laser light or narrowing recording track pitch.

By the method of narrowing recording track pitch, minimization of the track pitch is limited by the size of light spot converged on the disc surface. If the track pitch is narrowed without improvement of the size of the light spot, recorded signal of target track may be reproduced together with recorded signals of neighboring tracks thereof, and the read-out signal may include large crosstalk. Therefore, recorded signal of the target track cannot be correctly obtained. As one of the countermeasures for the crosstalk problem, there is proposed a method of irradiating three light beams on three neighboring recording tracks, respectively, reading out signals from the three recording tracks and eliminating crosstalk mixed in the center of the three recording tracks utilizing read-out signals of the two neighboring tracks on both sides of the center track. In a method proposed in Japanese Patent Application Laid-Open No. Hei:3-40225, variable-frequency filters are provided and filter coefficients prescribing frequency characteristics of the filters are varied so that read-out signal of the center track does not include crosstalk signal, thereby cancelling crosstalk components. Another proposal teaches calculating cancellation coefficients so that read-out signals of neighboring tracks do not have correlation with each other.

However, according to the above-mentioned techniques, calculation of optimum filter coefficients takes a certain period of time, and hence it is difficult to rapidly follow up the variation of disc condition. In addition, those techniques cannot eliminate affection by asymmetrical aberration (coma-aberration) of lens-system in reproduction apparatus or curvature of optical disc, and therefore crosstalk cannot be sufficiently reduced.

On the other hand, in reproduction of signal from an optical disc, it is necessary to adjust, in phase, clock signal of read-out signal to a reference clock produced by the reproduction apparatus. In a general optical disc, clock-pits CP are formed on the recording surface, as illustrated in FIG. 1A, and the timings of clock-pits CP are detected as peak points in waveform of reproduced signal. Then, the detected timings of the clock-pits CP are compared with timings of the reference clock to obtain phase error of the reference clock with respect to the reproduced signal. However, when rotation of spindle motor in an apparatus used for original recording of optical disc is irregular, the clock-pits CP are formed out of alignment in radial direction of the disc as shown in FIG. 1B, although they should be formed in alignment as shown in FIG. 1A. When this phenomenon takes place in an optical disc having narrowed track pitch, clock-pit signal of neighboring tracks are mixed into the reproduction signal of target track at shifted timings due to large crosstalk, and therefore phase error of the reference clock with respect to the reproduced clock signal cannot be correctly detected.

SUMMARY OF THE INVENTION

It is an object of the present invention to provide an optical disc of high recording density and large recording capacity in which crosstalk is rapidly and sufficiently cancelled by following variation of disc condition.

It is another object of the present invention to provide a signal processing circuit for use in an reproduction apparatus of the optical disc, by which crosstalk quantity and phase error of reference clock with respect to reproduced signal can be correctly detected.

According to one aspect of the present invention, there is provided an optical disc including: reference signal region formed on the optical disc over a plurality of spirally turned recording tracks in radial direction of the optical disc, each of the recording tracks in the reference signal region including: first region on which a plurality of first pit portion having first period are formed; and second region on which at least a second pit portion having second period is formed, each of the second pit portions being positioned out of alignment with the second pit portions on neighboring tracks.

According to another aspect of the present invention, there is provided a signal processing circuit for an optical disc including: reference signal region formed on the optical disc over a plurality of spirally turned recording tracks in radial direction of the optical disc, each of the recording tracks in the reference signal region including: first region on which a plurality of first pit portion having first period are formed; and second region on which at least a second pit portion having second period is formed, each of the second pit portions being positioned out of alignment with the second pit portions on neighboring tracks, the circuit including: unit for reading out one of the recording track and outputting read-out signal; unit for detecting levels of the read-out signal from a position of the second pit portion; unit for detecting levels of the read-out signal from a position where the second pit portion is present on neighboring recording track; and unit for calculating crosstalk from the neighboring track on the basis of the detected levels.

According to still another aspect of the present invention, there is provided a signal processing circuit for an optical disc including: reference signal region formed on the optical disc over a plurality of spirally turned recording tracks in radial direction of the optical disc, each of the recording tracks in the reference signal region including: first region on which a plurality of first pit portion having first period are formed; and second region on which at least a second pit portion having second period is formed, each of the second pit portions being positioned out of alignment with the second pit portions on neighboring tracks, the circuit including: unit for reading out one of the recording track and outputting read-out signal; unit for sampling the read-out signal at timings of a reference clock; unit for detecting levels of the sampled read-out signal from a position of the second pit in the second pit portion; unit for detecting levels of the sampled read-out signal from a position of the non-pit area in the second pit portion; and unit for calculating phase error between the reference clock and the read-out signal on the basis of the levels detected.

According to the present invention, crosstalk component and phase error of clock signals are sufficiently reduced, and therefore recording density and capacity of optical disc can be improved free from problem of crosstalk.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 5 is a schematic diagram illustrating sampled data of second read-out signal;

FIG. 7 is a diagram illustrating waveforms of read-out signals according to a modification of the first embodiment;

DESCRIPTION OF THE PREFERRED EMBODIMENTS

Preferred embodiments of the present invention will be described below with reference to the accompanying drawings.

Figure 1A:
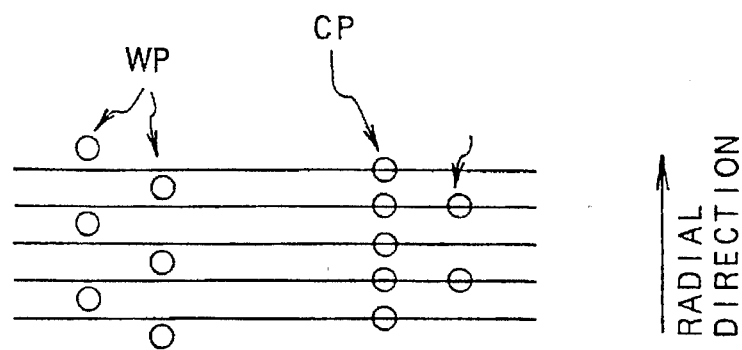
FIGS. 1A and 1B are diagrams illustrating arrangements of clock-pits formed on an optical disc.
Figure 1B:
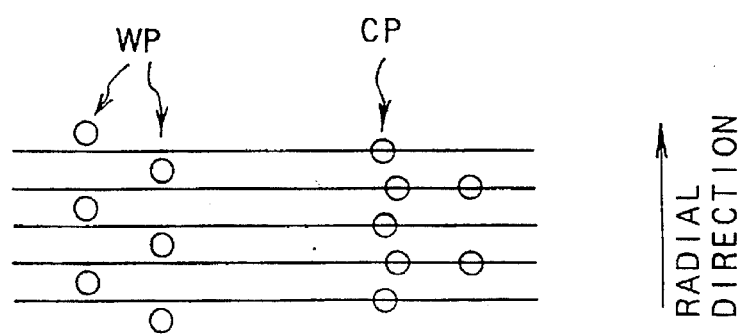
Figure 2A:
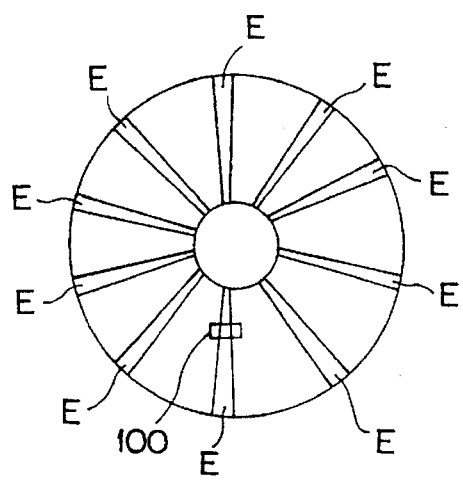
FIG. 2A is a plan view illustrating signal recording condition of an optical disc according to the present invention.

1st Embodiment:

FIG. 2A is a plan view illustrating signal recording condition of an optical disc according to the present invention. The optical disc shown in FIG. 2A is provided with signal pit array formed spirally on signal recording surface of the disc from inner circumference to outer circumference thereof. The signal pit array serves as track on which signal is recorded by forming information pits. In addition to this, according to this invention, the optical disc is provided with a plurality of crosstalk detection regions E arranged radially from disc center to outer periphery of the disc with given equal angular shifts therebetween. In other words, the crosstalk detection regions E are formed every given rotational angles, and, in a crosstalk detection region E, portions of the crosstalk detection region on each of the plural tracks are in alignment with each other in a radial direction of the disc. The crosstalk detection region E is formed in at least one radial direction of the optical disc.

Figure 2B:
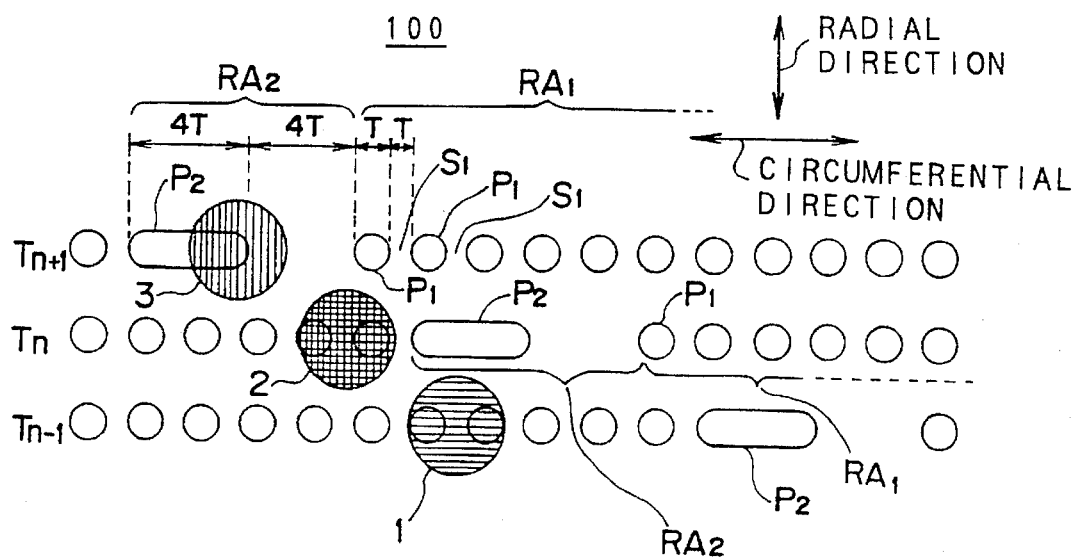
FIG. 2B is an enlarged plan view illustrating arrangement of signal pits in a portion of crosstalk detection region shown in FIG. 2A.

FIG. 2B is an enlarged plan view illustrating arrangement of pits in a portion 100 of crosstalk detection region E shown in FIG. 2A. As illustrated in FIG. 2B, each of tracks $T_{n-1}$, $T_n$, $T_{n+1}$ in the region 100 includes a first control region $RA_1$ where a plurality of first control pits $P_1$ each having pit length T are formed and a second control region $RA_2$ where a second control pit $P_2$ having pit length 4T is formed. The first control region $RA_1$ includes the first control pits $P_1$ and space portions $S_1$ having the same length as the first control pit $P_1$ and formed alternately with the first control pits $P_1$ in the circumferential direction of the optical disc. The second control region $RA_2$ includes the second control pit $P_2$ and space portion $S_2$ having the same length as the second control pit $P_2$. As illustrated, within the crosstalk detection region E, the second control regions $RA_2$ on neighboring tracks are formed out of alinement with each other in radial direction of the disc. It is noted that plural second control regions $RA_2$ may be formed on a single track within a crosstalk detection region E. According to the above structure, in each of the first and second control regions $RA_1$ and $RA_2$, the control pits $P_1$, $P_2$ and space portions $S_1$, $S_2$ are in one-to-one correspondence and ratio in lengths of the control pits to the space portions is equal to 1 in both the control regions and space regions, and hence reproduction signal of this region does not include DC component or low-frequency component. Therefore, reproduced signal of the optical disc does not include distortion in waveform such as sag which occurs due to low-frequency cutoff characteristics of light detection system such as an optical pickup, and crosstalk cancelling performance is not deteriorated by such distortion of reproduced signal.

Figure 3:
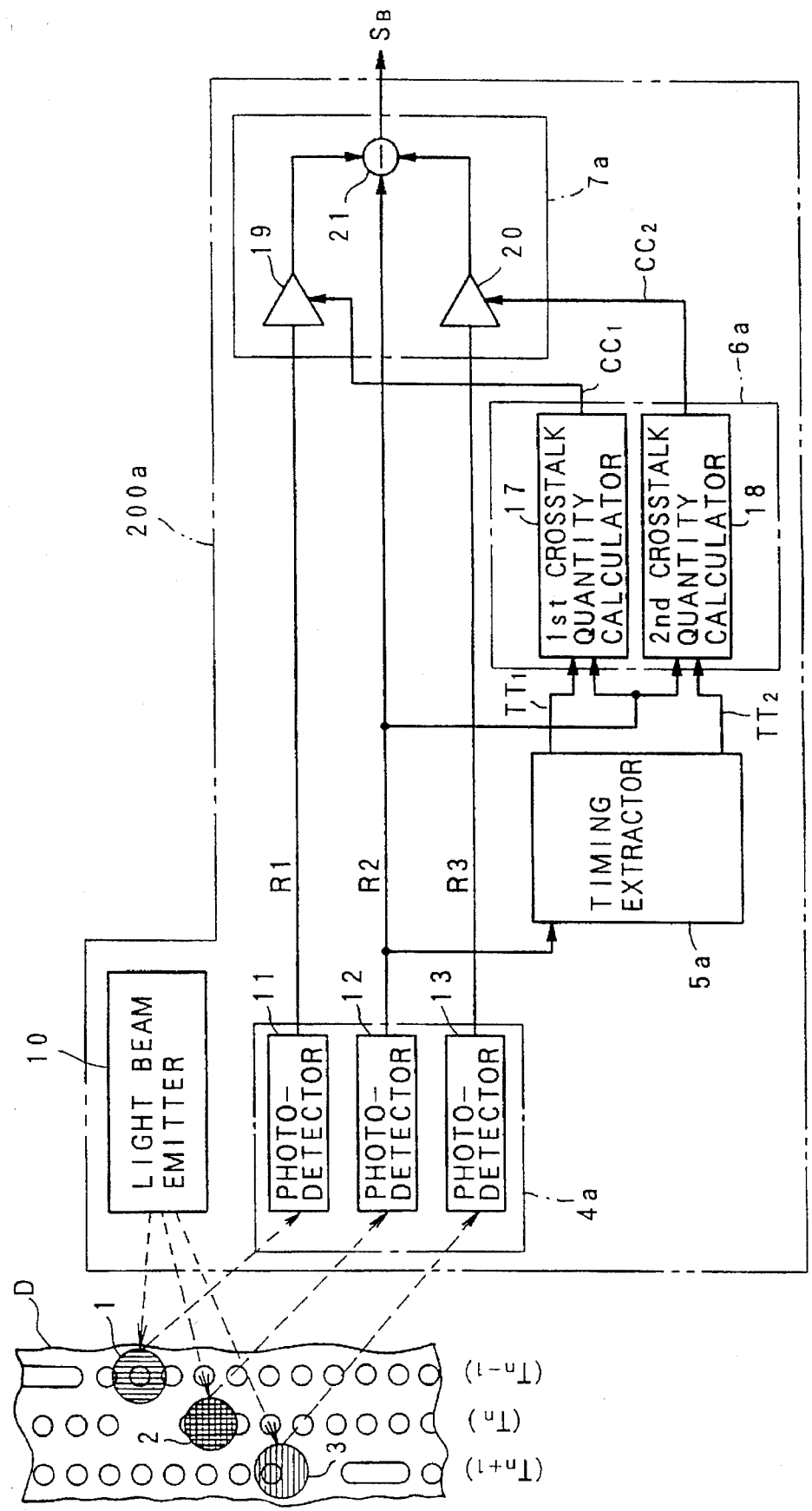
FIG. 3 is a block diagram illustrating a construction of an optical disc reproducing apparatus according to the present invention.

FIG. 3 is a block diagram illustrating a construction of an optical disc reproducing apparatus according to the present invention. As illustrated, the optical disc reproducing apparatus 200a irradiates light beams, utilizing light beam emitter 10, on three neighboring tracks on a signal recording surface of an optical disc D to produce three light spots 1, 2 and 3 in a manner shifted in track direction (circumferential direction), receives reflected lights of the light spots 1, 2 and 3, cancels crosstalk mixed from neighboring tracks $T_{n-1}$ and $T_{n+1}$ to center track $T_n$, and outputs signal recorded on the center track $T_n$. The construction of the optical disc reproducing apparatus 200a will be described in detail. The optical disc reproducing apparatus 200a includes light beam emitter 10, light detecting unit 4a, timing extractor 5a, crosstalk cancel control unit 6a and crosstalk cancel unit 7a. The light beam emitter 10 includes laser diode and objective lens, and emits light beam. The light detecting unit 4a receives lights reflected by the optical disc D and outputs read-out signals. The timing extractor 5a outputs first sampling timing signal $TT_1$ and second sampling timing signal $TT_2$ based on read-out signal outputted by the light detecting unit 4a. The crosstalk cancel control unit 6a outputs crosstalk cancel signals $CC_1$ and $CC_2$ based on the sampling timing signals $TT_1$ and $TT_2$. The crosstalk cancel unit 7a carries out crosstalk cancelling based on the crosstalk cancel control signal $CC_1$ and $CC_2$ and read-out signals $R_1$–$R_3$.

Next, constructions of each parts of the optical disc reproducing apparatus 200a will be described in more detail.

The light detecting unit 4a includes first photodetector 11 for receiving reflected light from the light spot 1 and performs photoelectric conversion to output first read-out signal $R_1$, second photodetector 12 for receiving reflected light from the light spot 2 and performs photoelectric conversion to output second read-out signal $R_2$ and third photodetector 13 for receiving reflected light from the light spot 3 and performs photoelectric conversion to output third read-out signal $R_3$. The crosstalk cancel control unit 6a includes first crosstalk quantity calculator 17 and second crosstalk quantity calculator 18. The first crosstalk quantity calculator 17 calculates crosstalk quantity from recording track $T_{n-1}$ to recording track $T_n$ based on the second read-out signal $R_2$ and the first sampling timing signal $TT_1$, and outputs first crosstalk cancel control signal $CC_1$. The second crosstalk quantity calculator 18 calculates crosstalk quantity from recording track $T_{n+1}$ to recording track $T_n$ based on the second read-out signal $R_2$ and the second sampling timing signal $TT_2$, and outputs second crosstalk cancel control signal $CC_2$. The crosstalk cancel unit 7a includes first amplifier 19, second amplifier 20 and subtracter 21. The first amplifier 19 varies gain of the first read-out signal $R_1$ outputted from the first photodetector 11 in correspondence with the first crosstalk cancel control signal $CC_1$. The second amplifier 20 varies gain of the third read-out signal $R_3$ outputted from the third photodetector 13 in correspondence with the second crosstalk cancel control signal $CC_2$. The subtracter 21 subtracts output signals of the first amplifier 19 and the second amplifier 20 from the second read-out signal $R_2$ outputted by the second photodetector 12.

Figures 4, 4A, 4B, 4C, 4D:
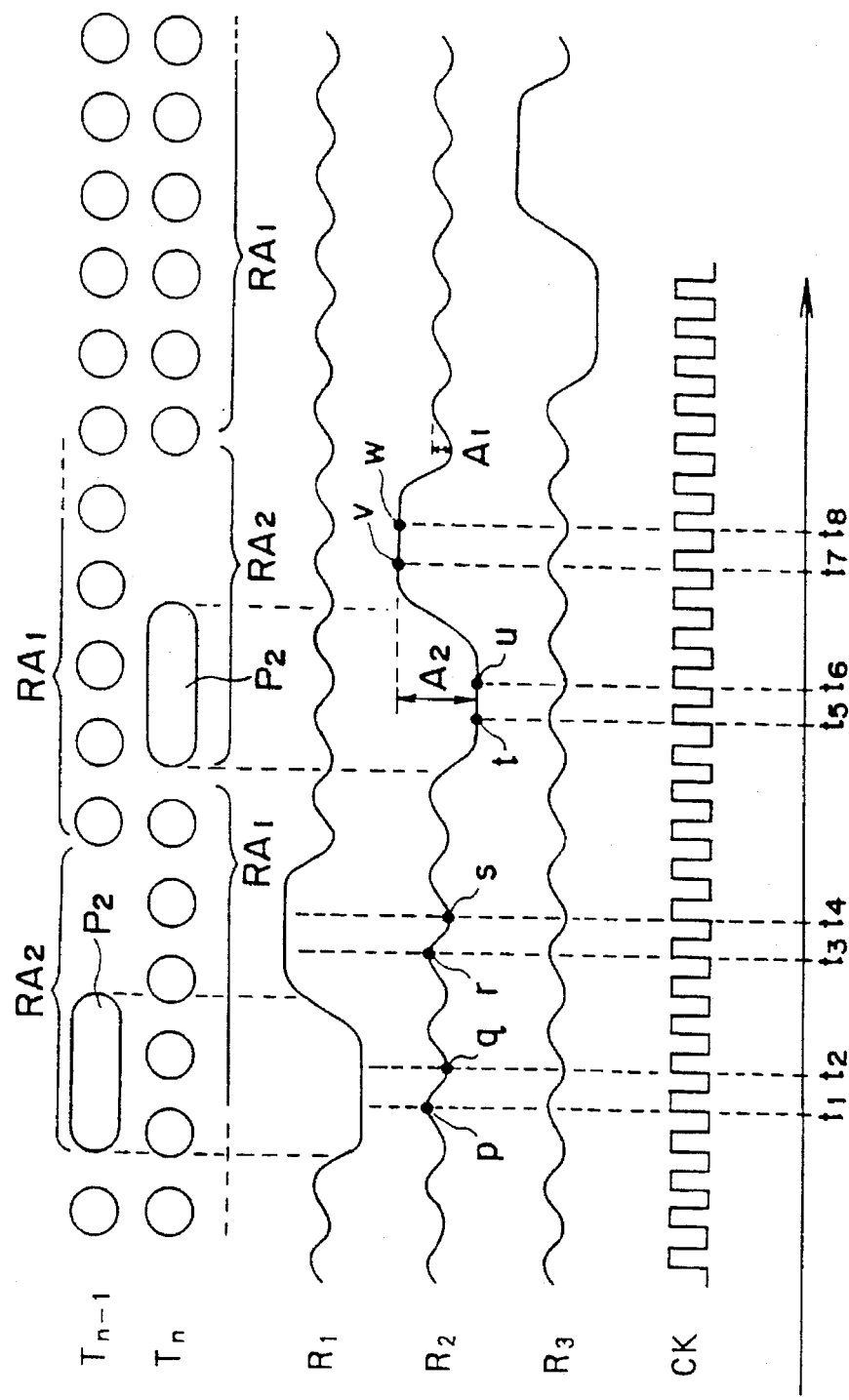
FIG. 4 is a diagram illustrating waveforms of read-out signals of the optical disc.

Next, crosstalk cancel operation will be described in detail with reference to FIG. 4. For the sake of simplicity, the following description is directed at a case of cancelling crosstalk from the recording track $T_{n-1}$ to the recording track $T_n$. The timing extractor 5a supplies the first sampling timing signal $TT_1$ corresponding to timings $t_1$-$t_8$ shown in FIG. 4 to the first crosstalk quantity calculator 17 on the basis of the second read-out signal $R_2$. In response, the first crosstalk quantity calculator 17 samples levels p-w of the second read-out signal $R_2$ at the timings $t_1$-$t_8$. The signal levels p and q include crosstalk component of the second control pit $P_2$ in the second control region $RA_2$ on the recording track $T_{n-1}$, and the signal levels r and s include crosstalk component of the space portion in the second control region $RA_2$ on the recording track $T_{n-1}$. The signal levels t and u represent level of the second control pit $P_2$ itself in the second control region $RA_2$ on the recording track $T_n$, and the signal levels v and w represent level of the space portion itself in the second control region $RA_2$ on the recording track $T_n$. Using these signal levels p-w, the first crosstalk quantity calculator 17 calculates crosstalk quantity $K_{n-1,n}$ from the recording track $T_{n-1}$ to the recording track $T_n$ by the following equation:

$$K_{n-1,n}=((r+s)-(p+q))/((v+w)-(t+u)). \quad (1)$$

Then, the first crosstalk quantity calculator 17 supplies the first crosstalk cancel control signal $CC_1$ corresponding to the crosstalk quantity $K_{n-1,n}$ thus calculated to the first amplifier 19. The second crosstalk quantity calculator 18 performs operation similar to the first crosstalk quantity calculator 17.

Now, details of the crosstalk cancel operation will be described by referring to FIG. 5. FIG. 5 schematically illustrates data of the second read-out signal $R_2$ obtained from the recording track $T_n$ sampled at timings corresponding to the clock signal CK. In FIG. 5, the horizontal axis represents time and the vertical axis represents level and polarity of the read-out signal $R_2$. Data $p_1$ and data $p_2$ ($|P_1|=|P_2|$) are sampled data of the second read-out signal $R_2$ in the first control region $RA_1$ where there is no crosstalk from the neighboring recording tracks and are used as reference data for sampled data in the first control region $RA_1$. On the other hand, data $q_1$-$q_4$ are sampled data of the second read-out signal $R_2$ in the first control region $RA_1$. However, due to crosstalk from the neighboring recording track $T_{n-1}$, data $q_1$ and $q_2$ are of lower levels than the reference data $p_1$, and data $q_3$ and $q_4$ are of higher levels than the reference data $p_2$. Data $r_1$-$r_4$ are sampled data of the read-out signal $R_2$ in the second control region $RA_2$. As shown in FIG. 4, signal level difference $A_2$ of the second read-out signal $R_2$ in the second control region $RA_2$ measured from peak to peak and signal level difference $A_1$ of the second read-out signal $R_2$ in the first control region $RA_1$ measured from peak to peak have a relationship: $A_2 > A_1$, and hence crosstalk components mixed in data $r_1$-$r_4$ from the neighboring tracks are relatively small. Data $s_1$-$s_4$ are sampled data of the second read-out signal $R_2$ in the first control region $RA_1$. However, due to crosstalk from the neighboring recording track $T_{n+1}$, data $s_1$ and $s_2$ are of lower levels than the reference data $p_1$ and data $s_3$ and $s_4$ are of higher levels than the reference data $P_2$. As described above, crosstalk from the recording track $T_{n-1}$ to the recording track $T_n$ reflects and affects the signal levels of data $q_1$-$q_4$, and crosstalk from the recording track $T_{n+1}$ to the recording track $T_n$ reflects and affects the signal levels of data $s_1$-$s_4$. Therefore, crosstalk from the neighboring recording tracks are detected in the following manner using data $q_1$-$q_4$ and data $s_1$-$s_4$. Crosstalk quantity $K_{n-1,n}$ from the recording track $T_{n-1}$ to the recording track $T_n$ is expressed by:

$$K_{n-1,1}=((q_3+q_4)-(q_1+q_2))/((r_3+r_4)-(r_1+r_2)). \quad (2)$$

In this equation, the numerator represents signal level difference from peak to peak of crosstalk signal from the recording tack $T_{n-1}$, and the denominator represents signal level difference from peak to peak of read-out signal $R_2$ of the recording track $T_n$. Similarly, crosstalk quantity $K_{n+1,n}$ from the recording track $T_{n+1}$ to the recording track $T_n$ is expressed by:

$$K_{n+1,1}=((s_3+s_4)-(s_1+s_2))/((r_3+r_4)-(r_1+r_2)). \quad (3)$$

By setting the amplifiers 19 and 20 to have gains (attenuations) corresponding to the crosswalk quantities $K_{n-1,n}$ and $K_{n+1,n}$ thus obtained, the output signals of the amplifiers 19 and 20 become substantially equal to the crosstalk components, and the subtracter 21 cancels crosstalk component from the read-out signal $R_2$ of the recording track $T_n$.

In the above-described crosstalk cancel method, read-out signal varying time to time (i.e., non-flat waveform) is sampled. Namely, within a region used for crosstalk detection, waveform of signal is varying. Nevertheless, correct crosstalk cancel can be carried out. This is due to the following reasons. With respect to data $q_1$-$q_4$, for example, data $q_1$ and $q_2$ are in opposite phase with data $q_3$ and $q_4$. In addition, since data $q_1$-$q_4$ are very close with each other in time, magnitude levels of the read-out signal at the timings are substantially equal to each other if there is no crosstalk. In this regard, in the above equations (2) and (3), component of the read-out signal is cancelled and only crosstalk component is obtained. Therefore, crosstalk component from the neighboring tracks can be correctly obtained using read-out signal varying time to time. Similarly, with respect to data $s_1$-$s_4$, component of read-out signal is cancelled, and crosstalk component from the neighboring tracks can be correctly obtained.

According to another method, crosstalk quantity $K_{n-1,n}$ from the recording track $T_{n-1}$ to the recording track $T_n$ is expressed as:

$$K_{n-1,n}=(q_3-q_1)/(r_3-r_1),$$

and crosstalk quantity $K_{n+1,n}$ from the recording track $T_{n+1}$ to the recording track $T_n$ is expressed as:

$$K_{n+1,n}=(s_3-s_1)/(r_3-r_1).$$

In the above embodiment, the first control pit $P_1$ has pit length 1T and the second control pit $P_2$ has pit length 4T. In this manner, by determining pit lengths of the second control pit $P_2$, i.e., the longer pit, and the first control pit $P_1$, i.e., the shorter pit, so that the second control pit $P_2$ has pit length an even number times longer than the first control pit $P_1$, relationship in phase of the first control pit $P_1$ and the second control pit $P_2$ is kept constant and regular for whole control regions. Thereby, crosstalk component from the neighboring tracks can be correctly detected using read-out signal varying time to time.

Figure 6:
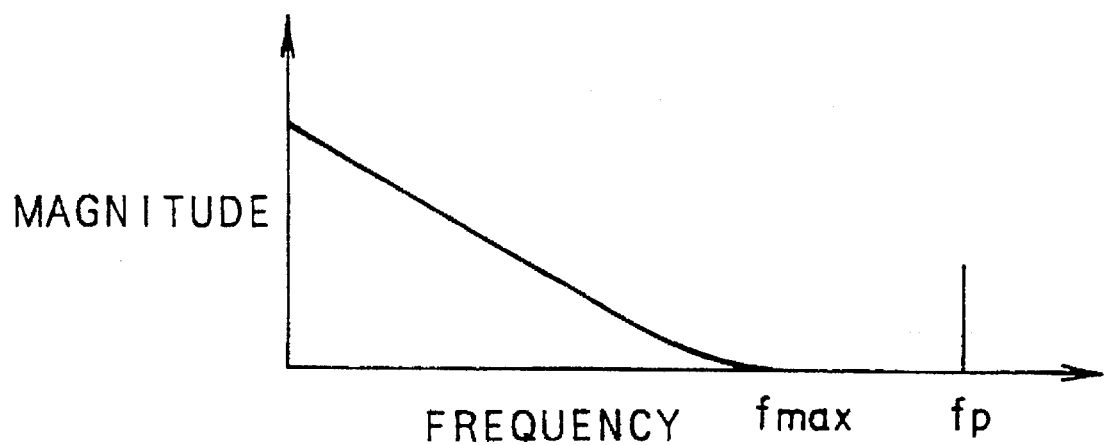
FIG. 6 is a graph illustrating a relationship between repetition frequency of recorded signal and frequency characteristics of reproduction system.

Further, the length of the first control pit $P_1$ may be determined to be shorter than an optical resolution limit of reproducing apparatus. In such a case, spatial frequency of the first control pit $P_1$ is higher than the spatial frequency at the resolution limit. In other words, repetition frequency $f_p$ of the first control pits $P_1$ exceeds frequency $f_{max}$ of the resolution limit at which magnitude of signal becomes zero, as shown in FIG. 6. The frequency $f_{max}$ of the resolution limit is determined by a wavelength of read-out light and numerical aperture of objective lens used in a reproduction apparatus. Waveform of read-out signal in this case is as illustrated in FIG. 7. Namely, waveform of read-out signal in the first control region $RA_1$ becomes flat, and therefore sampling timings of the read-out signal may be determined at any timings.

Figure 8A:
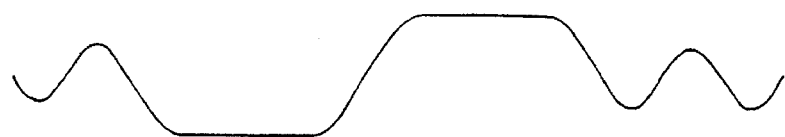
FIG. 8A is a diagram illustrating a waveform of reproduced signal of the optical disc shown in FIG. 2.
Figure 8B:
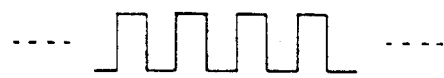
FIG. 8B is schematic diagram illustrating sampled data of reproduced signal where reference reproduction clock is in phase with reproduced signal.
Figure 8B:
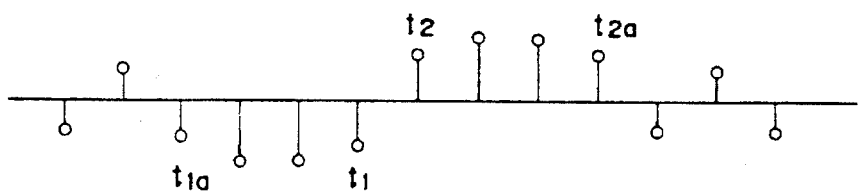

2nd Embodiment:

The second embodiment is directed to a case of detecting phase error between reference reproduction clock of reproducing apparatus and reproduced signal using the optical disc according to this invention. FIG. 8A illustrates a waveform of reproduced signal of the optical disc shown in FIG. 2A. FIG. 8B schematically illustrates sampled data of reproduced signal where reference reproduction clock is in phase with the reproduced signal shown in FIG. 8A (phase error is zero). Sampled data used for phase error detection is data $t_1$ (<0) corresponding to the second control pit in the second control region $RA_2$ and data $t_2$ (>0) corresponding to the space portion. In this case, since the reproduced signal and the reference reproduction clock are in phase, the equation: $|t_1|=|t_2|$ stands, and phase error data $\phi_e$ is expressed as:

$$\phi_e=t_1+t_2=0. \qquad (4)$$

Figure 8C:
FIG. 8C is a schematic diagram illustrating sampled data of reproduced signal where reference reproduction clock is lagged, in phase, behind the reproduced signal.
Figure 8C:
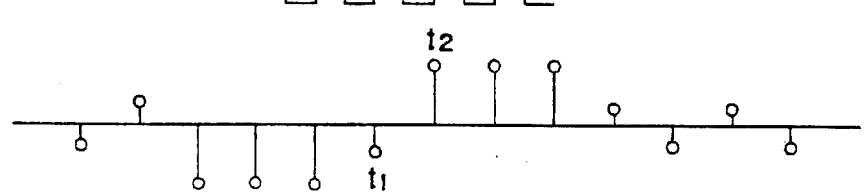

FIG. 8C schematically illustrates sampled data of reproduced signal where reference reproduction clock is lagged in phase behind the reproduced signal. In this case, since the reference reproduction clock is lagged, the relationship: $|t_1|<|t_2|$ stands, and phase error data $\phi_e$ is expressed as:

$$\phi_e=t_1+t_2>0. \qquad (5)$$

Figure 8D:
FIG. 8D is a schematic diagram illustrating sampled data of reproduced signal where reference reproduction clock is preceding, in phase, the reproduced signal.
Figure 8D:
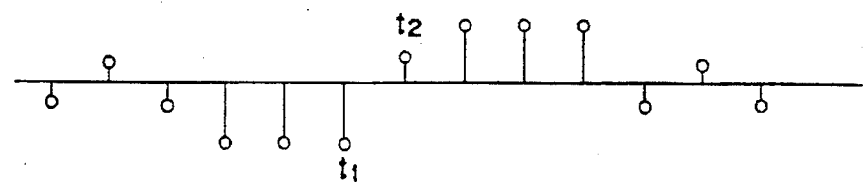

Similarly, FIG. 8D schematically illustrates sampled data of reproduced signal where reference reproduction clock is preceding, in phase, the reproduced signal. In this case, since the reference reproduction clock is preceding, the relationship: $|t_1|>|t_2|$ stands, and phase error data $\phi_e$ is expressed as:

$$\phi_e=t_1+t_2<0. \qquad (6)$$

Figure 9:
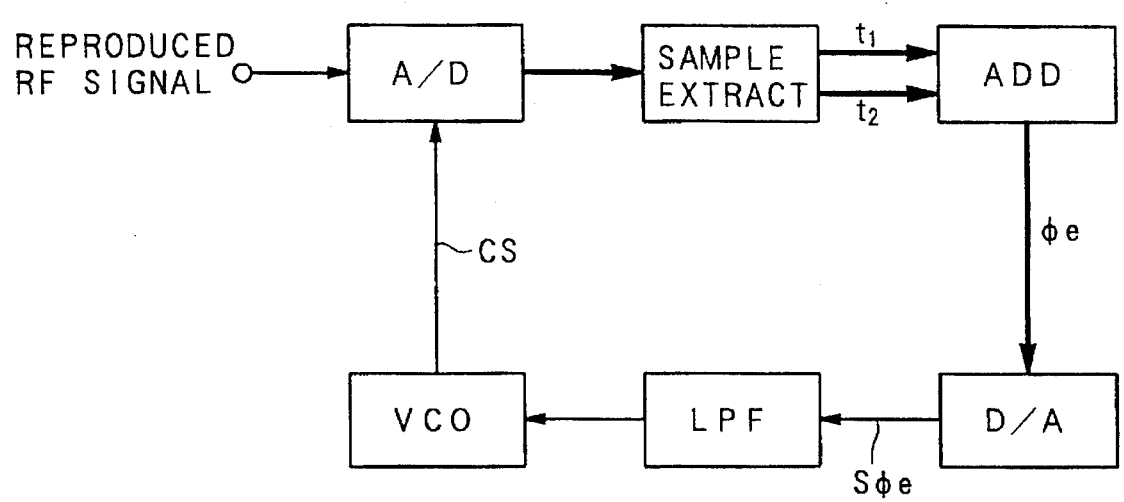
FIG. 9 is a block diagram illustrating a PLL (phase Locked Loop) circuit according to the second embodiment.

FIG. 9 illustrates a PLL (phase Locked Loop) circuit according to this embodiment. Phase error data $\phi_e$ obtained as digital data by the above-described manner is converted into an analog phase error signal $S\phi_e$ by D/A converter. By supplying the phase error signal $S\phi_e$ to VCO (Voltage Controlled Oscillator) via LPF to perform feedback control, phase error of the reference reproduction clock can be corrected. In this case, data $t_1$ and $t_2$ used in phase error detection are sampled values ($t_1<0<t_2$) of pits in opposite phase relation. In this regard, even when read-out signal is suffered from crosstalk mixed from the neighboring track, the affection of crosstalk is cancelled in the phase error signal which is sum of data $t_1$ and $t_2$. Therefore, correct phase error detection is ensured in a case of optical disc having large crosstalk, such as, high recording density type optical disc having narrowed track pitch.

In the above embodiment, the phase error data $\phi_e$ is expressed as: $\phi_e=t_1+t_2$. However, it may be alternatively expressed as:

$$\phi_e=-t_{1a}+t_1+t_2-t_{2a} \qquad (7)$$

using data $t_{1a}$ (<0) corresponding to the second control pit in the second control region shown in FIG. 8B, and data $t_{2a}$ (>0) corresponding to the space portion in the second control region. Although the control regions are used as crosstalk detection region or clock phase error detection region, they may alternatively be used as detection region of magnitude of reproduced signal, focus detection region or tracking detection region.

As described above, according to the present invention, the second control pit regions on neighboring recording tracks are positioned out of alignment with each other in circumferential direction of the disc within the crosstalk detection region. Therefore, when read-out signal of a second control pit region is used for various control, the controls are not suffered from second control pit regions on neighboring tracks, thereby stabilizing the controls. Further, in the first and second control pit regions, length of pit region and no-pit region are equal to each other. Therefore, read-out signal of the control pit region does not include DC or low-frequency component and no waveform distortion takes place due to low-frequency cut-off characteristics of reproduction system, thereby enabling highly accurate control. Further, in crosstalk cancel operation, variation of read-out signal in the first control pit region is cancelled and only crosstalk component can be readily obtained. Therefore, crosstalk cancelling can be achieved accurately, and reproduction apparatus can reproduce signal correctly with improved S/N ratio. Further, in phase error correction, crosstalk component from neighboring tracks is cancelled and only clock error component can be easily detected. Therefore, accurate reproduction control can be achieved free from interference due to uneven or irregular rotation of spindle motor of reproduction apparatus.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. An optical disc comprising:
a reference signal region formed on said optical disc over a plurality of spirally turned recording tracks in a radial direction of the optical disc, each of said recording tracks in said reference signal region comprising:
a first region on which are formed a plurality of first pit portions having a predetermined first period; and
a second region on which at least a second pit portion having a predetermined second period is formed, each of said second pit portions being positioned out of alignment with the second pit portions on neighboring tracks.

2. An optical disc according to claim 1, wherein said second period is an even number times larger than said first period.

3. An optical disc according to claim 1, wherein said first pit portion comprises a first pit and a first non-pit area having substantially identical lengths, and said second pit portion comprises a second pit and a second non-pit area having substantially identical length.

4. An optical disc according to claim 1, wherein said first region and said second region are alternatively formed in the reference signal region.

5. An optical disc according to claim 1, wherein said first pit portions are formed at spatial frequency higher than spatial frequency determined by a wavelength of read-out lightand numerical aperture of objective lens used in a reproduction apparatus.

6. Signal processing circuit for an optical disc comprising:
reference signal region formed on said optical disc over a plurality of spirally turned recording tracks in radial direction of the optical disc, each of said recording tracks in said reference signal region comprising:
first region on which a plurality of first pit portion having first period are formed; and
second region on which at least a second pit portion having second period is formed, each of said second pit portions being positioned out of alignment with the second pit portions on neighboring tracks, said circuit comprising:
means for reading out one of the recording track and outputting read-out signal;
means for detecting levels of the read-out signal from a first position of the second pit portion;
means for detecting levels of the read-out signal from a second position where the second pit portion is present on neighboring recording track; and
means for calculating crosstalk from the neighboring track by operating on the detected levels at the first position and the second position.

7. Signal processing circuit for an optical disc comprising:
reference signal region formed on said optical disc over a plurality of spirally turned recording tracks in radial direction of the optical disc, each of said recording tracks in said reference signal region comprising:
first region on which a plurality of first pit portion having first period are formed; and
second region on which at least a second pit portion having second period is formed, each of said second pit portions being positioned out of alignment with the second pit portions on neighboring tracks, said circuit comprising:
means for reading out one of the recording track and outputting read-out signal;
means for sampling the read-out signal at timings of a reference clock;
means for detecting levels of the sampled read-out signal from a first position of the second pit in the second pit portion;
means for detecting levels of the sampled read-out signal from a second position of the non-pit area in the second pit portion; and
means for calculating phase error between the reference clock and the read-out signal by operating on the detected levels at the first position and the second position.

* * * * *